(12) United States Patent
Kauppinen et al.

(10) Patent No.: US 10,931,564 B2
(45) Date of Patent: Feb. 23, 2021

(54) HANDLING OF ACKNOWLEDGEMENT IN WIRELESS RADIO AD-HOC NETWORKS

(71) Applicant: Telefonaktiebolaget LM Ericsson (publ), Stockholm (SE)

(72) Inventors: Tero Kauppinen, Espoo (FI); Parth Amin, St. Albans (GB); Nicklas Beijar, Kirkkonummi (FI); Luis Felipe Del Carpio Vega, Espoo (FI); Petri Laari, Espoo (FI); Anna Larmo, Espoo (FI); Mohit Sethi, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/756,779

(22) PCT Filed: Sep. 2, 2015

(86) PCT No.: PCT/SE2015/050921
§ 371 (c)(1),
(2) Date: Mar. 1, 2018

(87) PCT Pub. No.: WO2017/039502
PCT Pub. Date: Mar. 9, 2017

(65) Prior Publication Data
US 2018/0254976 A1 Sep. 6, 2018

(51) Int. Cl.
*H04L 12/721* (2013.01)
*H04W 40/24* (2009.01)
(Continued)

(52) U.S. Cl.
CPC ............... *H04L 45/14* (2013.01); *H04L 1/16* (2013.01); *H04L 45/16* (2013.01);
(Continued)

(58) Field of Classification Search
CPC ....... H04L 45/14; H04L 1/16; H04L 45/7453; H04L 45/16; H04W 88/16; H04W 12/10; H04W 40/248; H04W 84/18
See application file for complete search history.

(56) References Cited

U.S. PATENT DOCUMENTS

| 2013/0088999 A1* | 4/2013 | Thubert .............. H04W 40/248 370/254 |
| 2014/0036912 A1 | 2/2014 | Hui et al. |

(Continued)

FOREIGN PATENT DOCUMENTS

| CN | 101163106 A | 4/2008 |
| CN | 102812771 A | 12/2012 |
| WO | 2012051752 A1 | 4/2012 |

OTHER PUBLICATIONS

Ma "Secure Feedback Service in Wireless Sensor Networks", ISPEC 2007. LNCS 4464. pp. 116 128, 2007.*
(Continued)

*Primary Examiner* — Jae Y Lee
(74) *Attorney, Agent, or Firm* — Rothwell, Figg, Ernst & Manbeck, P.C.

(57) ABSTRACT

There is provided mechanisms for handling acknowledgements from nodes in a wireless radio ad-hoc network. A method is performed by a gateway of the wireless radio ad-hoc network. The method comprises transmitting radio signalling to nodes in the wireless radio ad-hoc network. The transmitted radio signalling is addressed to, and requiring acknowledgement from, at least one node in the wireless radio ad-hoc network. The method comprises receiving radio signalling from a node in the wireless radio ad-hoc network. The received radio signalling comprises one in-packet Bloom Filter comprising acknowledgement of the transmitted radio signalling from at least one of the nodes.

20 Claims, 7 Drawing Sheets

(51) Int. Cl.
　　　H04L 12/743　　　(2013.01)
　　　H04L 12/761　　　(2013.01)
　　　H04L 1/16　　　　(2006.01)
　　　H04W 88/16　　　(2009.01)
　　　H04W 84/18　　　(2009.01)
(52) U.S. Cl.
　　　CPC ....... H04L 45/7453 (2013.01); H04W 40/248 (2013.01); H04W 88/16 (2013.01); *H04W 84/18* (2013.01)

(56)　　　　　　References Cited

U.S. PATENT DOCUMENTS

| 2014/0036925 | A1  | 2/2014  | Hui et al. |            |
|--------------|-----|---------|------------|------------|
| 2015/0195296 | A1* | 7/2015  | Vasseur    | H04L 47/127 |
|              |     |         |            | 726/23     |
| 2015/0207725 | A1* | 7/2015  | Hui        | H04L 65/4076 |
|              |     |         |            | 370/390    |
| 2016/0328530 | A1* | 11/2016 | Felemban   | H04W 4/70  |

OTHER PUBLICATIONS

European Communication dated Oct. 18, 2018, issued in European Patent Application No. 15 771 736.4, 7 pages.

International Search Report and Written Opinion issued in International Application No. PCT/SE2015/050921, dated May 6, 2016, 15 pages.

DI MA ED—Ed Dawson et al., "Secure Feedback Service in Wireless Sensor Networks", May 2007, Information Security Practice and Experience; [Lecture Notes in Computer Science;;LNCS], Springer Berlin Heidelberg, Berlin, Heidelberg, pp. 116-128.

Castelluccia, C., et al., "A Robust Multisignature Scheme with Applications to Acknowledgement Aggregation," Springer-Verlag Berlin Heidelberg, C. Blundo and S. Cimato (Eds.): SCN 2004, LNCS 3352, pp. 193-207, 2005.

Communication pursuant to Article 94(3) EPC issued in European Application No. 15771736.4, dated Jan. 13, 2020 (7 pages).

3GPP TS 36.331 v12.3.0, 3rd Generation Partnership Project; Technical Specification Group Radio Access Network; Evolved Universal Terrestrial Radio Access (E-UTRA); Radio Resource Control (RRC); Protocol specification (Release 12), Sep. 23, 2014 (378 pages).

Chinese Office Action issued in corresponding Chinese Application No. 201580084145.7 dated May 6, 2020, 12 pages.

IEEE Standard for Information Technology—Telecommunications and information exchange between systems Local and metropolitan area netorks—Specific requirements, "Part 11: Wireless LAN Medium Access Control (MAC) and Physical Layer (PHY) Specification", Nov. 2012 (29 pages).

Z. Shelby et al., "The Constrained Application Protocol (CoAP)", Internet Engineering Task Force (IETF), Request for Comments (RFC) 7252, Category: Standards Track, ISSN: 2070-1721, Jun. 2014 (112 pages).

Bloom filger—Wikipedia, https://en.wikipedia.org/wiki/Bloom_filter, May 11, 2020 (14 pages).

* cited by examiner

HANDLING OF ACKNOWLEDGEMENT IN WIRELESS RADIO AD-HOC NETWORKS

CROSS REFERENCE TO RELATED APPLICATION(S)

This application is a 35 U.S.C. § 371 National Stage of International Patent Application No. PCT/SE2015/050921, filed Sep. 2, 2015, designating the United States, the disclosure of which is incorporated by reference.

TECHNICAL FIELD

Embodiments presented herein relate to wireless radio ad-hoc network s, and particularly to methods, a gateway, a node, computer programs, and a computer program product for handling acknowledgements from nodes in a wireless radio ad-hoc network.

BACKGROUND

In communications networks, there may be a challenge to obtain good performance and capacity for a given communications protocol, its parameters and the physical environment in which the communications network is deployed.

For example, it is foreseen that the number of connected devices will steadily increase. Examples of such connected device include, but are not limited to, sensors, actuators, Internet-of-Thing (IoT) devices, machine-to-machine (M2M) type communication devices, and the like. Potentially a large number of such devices can be grouped together in a group and thus controlled as a single unit instead of individual devices. In many situations, the same command needs to be sent to all members of such a group. Examples include, bit are not limited to, commands for switching on all lights in a building or on a street (where the devices thus are implemented in lighting devices), commands for providing measurements (where the devices thus are implemented in sensors), and so on. Within a group, control commands can be distributed to all members using multicast or broadcast. For example, multicast and broadcast messages can be used in IEEE 802.11 protocol based technologies (where IEEE is short for Institute of Electrical and Electronics Engineers) such as IEEE 802.11ah and be transmitted by an Access Point (AP) only after being signaled by a Delivery Traffic Indication Map (DTIM) or a Traffic Indication Map (TIM) beacon. The multicast and broadcast transmissions at IEEE 802.11 Media Access Control (MAC) level are not acknowledged of successful reception on protocol layer two (L2).

Further, the IEEE 802.11ah protocol defines a relay model where the network topology is not a simple star topology but instead comprises a tree structure where a relay node may communicated with other nodes, referred as stations, on behalf of the network node, referred to as an access point.

Another network topology in, e.g., IEEE 802.15.4 networks, is the mesh topology, where different nodes forward or relay the data for other nodes either according to a defined maximum number of hops or routing information defined in routing tables.

In general terms, a Bloom filter is a space-efficient probabilistic data structure that is used to test whether an element is a member of a set or not. Bloom filters are as such known in the art. One drawback of Bloom filters are false positives, i.e. the test whether a member is part of the set or not might be positive for a member that is not part of a set. In contrast, false negatives are not possible.

In case of constraint devices, the devices that form a group are often equipped with a short-range radio network interface such as interfaces for Bluetooth communications, or communications according to the IEEE 802.15.4, or IEEE 802.11ah protocol. The low bandwidth of communications networks employing these protocols limits the number of messages that can be sent in a unit of time.

If a group of devices is sent the same control command, the command packet itself can easily be sent by using multicast. In case of actuator control, the success rate of a transmission of the command should be above a given threshold. To ensure successful transmission, it is common to require acknowledgement of the transmitted packet from each addressed receiver, and to resend the packet until all acknowledgements are received. However, in some networks, a situation can arise where a considerable number of devices try to send an acknowledgement simultaneously as a response to a multicast or broadcast control command. This can easily lead to link congestion due to the number of concurrent attempts to send acknowledgements. Sometimes even the number of requested acknowledgements can cause link congestion, in particular on low-bandwidth links.

Hence, there is still a need for an improved handling of acknowledgements from nodes in a wireless radio ad-hoc network.

SUMMARY

An object of embodiments herein is to provide efficient handling of acknowledgements from nodes in a wireless radio ad-hoc network According to a first aspect there is presented a method for handling acknowledgements from nodes in a wireless radio ad-hoc network. The method is performed by a gateway of the wireless radio ad-hoc network. The method comprises transmitting radio signalling to nodes in the wireless radio ad-hoc network. The transmitted radio signalling is addressed to, and requiring acknowledgement from, at least one node in the wireless radio ad-hoc network. The method comprises receiving radio signalling from a node in the wireless radio ad-hoc network. The received radio signalling comprises one in-packet Bloom Filter comprising acknowledgement of the transmitted radio signalling from at least one of the nodes.

Advantageously this provides efficient handling of acknowledgements from nodes in a wireless radio ad-hoc network.

Advantageously this helps preventing links between nodes in the wireless radio ad-hoc network from getting congested in the case a vast number of nodes form a group that is sent commands which need to be acknowledged.

Advantageously, since Bloom filter checking does not require heavy computation, this allows for the nodes to be resource-constrained nodes.

Advantageously, the responding nodes need only to add their identity (or cryptographic hash of the identity) to the Bloom filter to indicate an acknowledgement. This cryptographic hash can be pre computed once to save resources.

Advantageously, nodes that are close to the gateway would receive and forward fewer messages from other (downstream) nodes than normally.

Advantageously, if timers are configured or negotiated properly, any node would only have to forward only one message irrespective of the number of acknowledgements coming from other (downstream) nodes.

Advantageously, depending on the topology or the network, the nodes can a priori know the maximum number of acknowledgement messages they will receive. Once they receive the maximum number of acknowledgement messages, they can switch off the radio to save battery, possibly assuming that communication occurs in well-defined timeslots only.

According to a second aspect there is presented a gateway for handling acknowledgements from nodes in a wireless radio ad-hoc network. The gateway comprises processing circuitry. The processing circuitry is configured to cause the gateway to perform a set of operations. The processing circuitry is configured to cause the gateway to transmit radio signalling to nodes in the wireless radio ad-hoc network. The transmitted radio signalling is addressed to, and requires acknowledgement from, at least one node in the wireless radio ad-hoc network. The processing circuitry is configured to cause the gateway to receive radio signalling from a node in said wireless radio ad-hoc network. The received radio signalling comprises one in-packet Bloom Filter comprising acknowledgement of the transmitted radio signalling from at least one of the nodes.

According to a third aspect there is presented a computer program for handling acknowledgements from nodes in a wireless radio ad-hoc network, the computer program comprising computer program code which, when run on processing circuitry of a gateway, causes the gateway to perform a method according to the first aspect.

According to a fourth aspect there is presented a method for handling acknowledgements in a wireless radio ad-hoc network. The method is performed by a node in the wireless radio ad-hoc network. The method comprises receiving radio signalling originally transmitted from a gateway in the wireless radio ad-hoc network. The radio signalling is addressed to, and requires acknowledgement from, at least one node in the wireless radio ad-hoc network. The method comprises verifying if an acknowledgement of the node is to be sent in response to the received signalling. If so, the method comprises including the acknowledgement of the node in one in-packet Bloom Filter. If so, the method comprises forwarding the one in-packet Bloom Filter towards the gateway.

According to a fifth aspect there is presented a node for handling acknowledgements in a wireless radio ad-hoc network. The node comprises processing circuitry. The processing circuitry is configured to cause the node to perform a set of operations. The processing circuitry is configured to cause the node to receiving radio signalling originally transmitted from a gateway in the wireless radio ad-hoc network. The radio signalling is addressed to, and requires acknowledgement from, at least one node in the wireless radio ad-hoc network. The processing circuitry is configured to cause the node to verify if an acknowledgement of the node is to be sent in response to the received signalling. The processing circuitry is configured to cause the node to, if so, include the acknowledgement of the node in one in-packet Bloom Filter. The processing circuitry is configured to cause the node to, if so, forward the one in-packet Bloom Filter towards the gateway.

According to a sixth aspect there is presented a computer program for handling acknowledgements in a wireless radio ad-hoc network, the computer program comprising computer program code which, when run on processing circuitry of a node, causes the node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
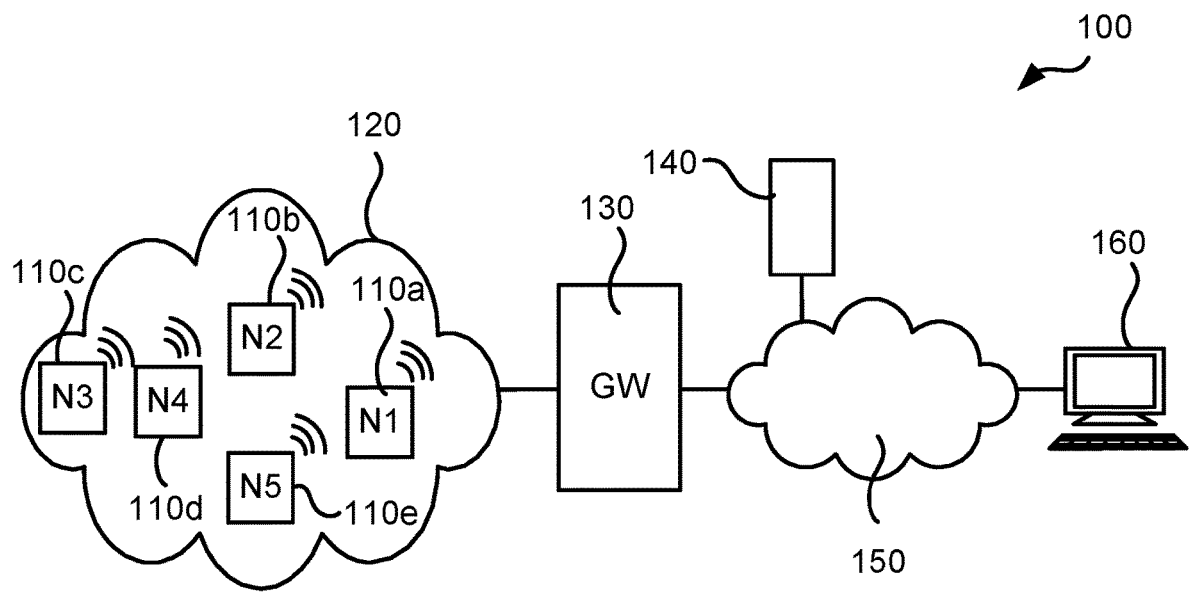
FIGS. 1, 9, 10, and 11 are schematic diagrams illustrating a communication network according to embodiments.
Figure 9:
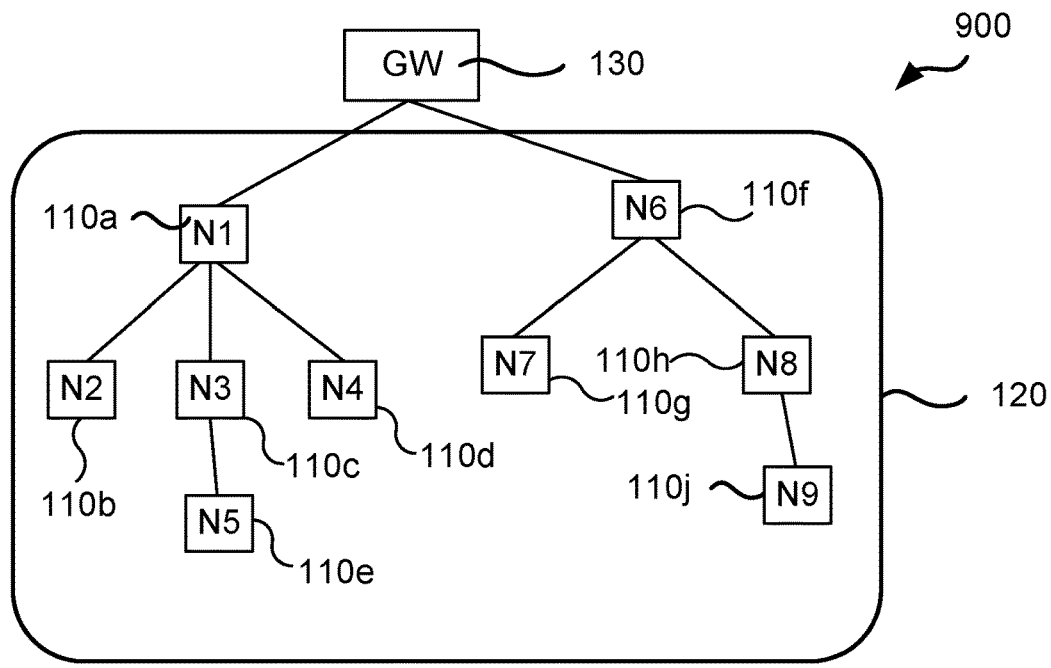

FIG. 1 is a schematic diagram illustrating a communications network 100 where embodiments presented herein can be applied. The communications network 100 comprises nodes 110a, 110b, 110c, 110d, 110e. Each node 110a-110e may be a portable wireless device, such as an Internet-of-Things (IoT) device, a sensor, an actuator, etc. The nodes 110a-110e are operatively connected to a wireless radio ad-hoc network 120, such as an information-centric networking (ICN) network. In turn, the wireless radio ad-hoc network 120 is operatively connected to an Internet Protocol (IP) network 150 via a gateway 130. A Domain Name System (DNS) server 140, and an IP node 160 are also operatively connected to the IP Internet network 150. By means of the gateway 130, communication and exchange of data may occur between the nodes 110a-110e and the IP node 160. Consider the communications network 900 of FIG. 9 comprising a wireless radio ad-hoc network 120 as in FIG. 1, where the wireless radio ad-hoc network 120 has a tree topology, and where the gateway 130 is located at the root of the tree. In the wireless radio ad-hoc network 120 node 110a is considered to be upstream nodes 110b-110e; node 110e is considered to be downstream nodes 110a-110d, and node 110c is considered to be downstream node 110a and upstream node 110e.

Suppose the gateway 130 is to send a command to all nodes 110a-110j (denoted N1-N9) in the wireless radio ad-hoc network 120 but requires to receive acknowledgements only from nodes N1, N2, N5, and N8. The gateway 130 can indicate this by adding in-packet Bloom filters (iBFs) 510a, 510b to the request containing the identifiers of these particular nodes. All nodes receiving the request can verify if their own identifier is included in the iBF, and if this is the case, they send an acknowledgement to the gateway 130.

An iBF can be implemented virtually on any protocol layer. For example, the Constrained Application Protocol (CoAP) provides the means for adding extension headers where iBFs can be delivered. iBFs can be used to reduce the total number of acknowledgement messages sent over the radio interface in an ad-hoc network.

Figure 10:
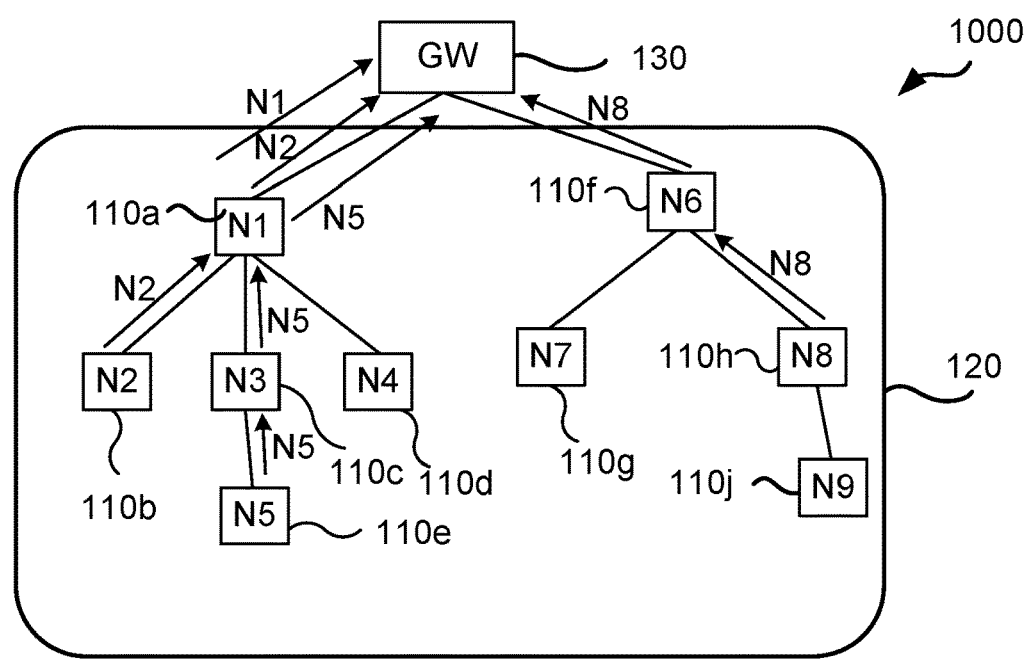

According to state of the art, each of these nodes would send their acknowledgements independently of each other. This is schematically illustrated in FIG. 10. FIG. 10 schematically illustrates a communications network 1000 having the same topology as the communications network 900 and where individual acknowledgements sent from nodes N1, N2, N5, and N8 are illustrated as upstream arrows, each arrow indicating the node to which the acknowledgement belongs.

As is visible from FIG. 10, due to many acknowledgements being sent from nodes downstream N1 in the tree topology, the link between N1 and the gateway 130 becomes congested. Essentially, nodes such as N1 and N6 that are closer to the gateway 130 would need to transmit more messages than nodes such as N5 and N9 that are further away from the gateway 130, causing congestion as well as degradation of power resources available to the nodes closer to the gateway 130; node N1 would need not only to transmit its own acknowledgement but also to forward separate acknowledgements from N2 and N5.

In order to limit the number of acknowledgement packets that are sent, the herein disclosed embodiments enable the responding nodes to merge/coalesce their individual acknowledgements into a small number of acknowledgement iBFs. Thus, the gateway 130 does not receive an individual acknowledgement from each node that it had sent a request to. Instead only a small number acknowledgement iBFs is received by the gateway 130.

The embodiments disclosed herein thus relate to mechanisms for handling acknowledgements from nodes in a wireless radio ad-hoc network 120. In order to obtain such a mechanism there is provided a gateway 130, a method performed by the gateway 130, a computer program comprising code, for example in the form of a computer program product, that when run on processing circuitry of the gateway 130, causes the gateway 130 to perform the method. In order to obtain such a mechanism there is further provided a node 110a, a method performed by the node 110a, and a computer program comprising code, for example in the form of a computer program product, that when run on processing circuitry of the node 110a, causes the node 110a to perform the method.

Figure 2A:
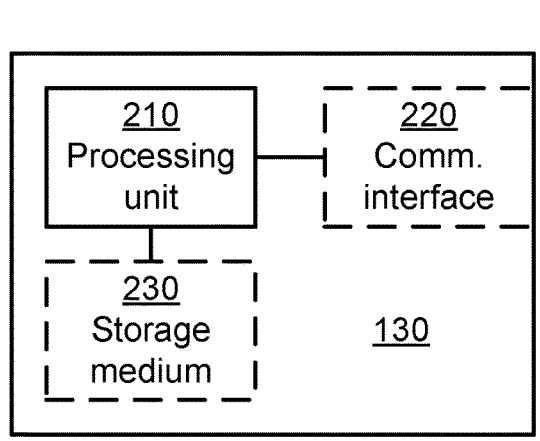
FIG. 2a is a schematic diagram showing functional units of a gateway according to an embodiment.

FIG. 2a schematically illustrates, in terms of a number of functional units, the components of a gateway 130 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410a (as in FIG. 4), e.g. in the form of a storage medium 230.

Particularly, the processing circuitry 210 is configured to cause the gateway 130 to perform a set of operations, or steps, S102-S116. These operations, or steps, S102-S116 will be disclosed below. For example, the storage medium 230 may store the set of operations, and the processing circuitry 210 may be configured to retrieve the set of operations from the storage medium 230 to cause the gateway 130 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The gateway 130 may further comprise a communications interface 220 for communications with at least one node 110a-110j, entities of the IP network 150, and optionally another gateway. As such the communications interface 220 may comprise one or more transmitters and receivers, comprising analogue and digital components and a suitable number of antennas for wireless communications and ports for wireline communications.

The processing circuitry 210 controls the general operation of the gateway 130 e.g. by sending data and control signals to the communications interface 220 and the storage medium 230, by receiving data and reports from the communications interface 220, and by retrieving data and instructions from the storage medium 230. Other components, as well as the related functionality, of the gateway 130 are omitted in order not to obscure the concepts presented herein.

Figure 2B:
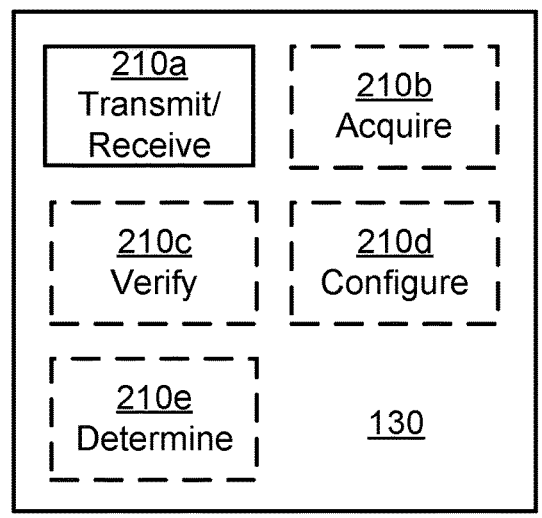
FIG. 2b is a schematic diagram showing functional modules of a gateway according to an embodiment.

FIG. 2b schematically illustrates, in terms of a number of functional modules, the components of a gateway 130 according to an embodiment. The gateway 130 of FIG. 2b comprises a number of functional modules; a transmit and/or receiver module 210a configured to perform below steps S102, S106, S112. The gateway 130 of FIG. 2b may further comprises a number of optional functional modules, such as any of an acquire module 210b configured to perform below step S114, a verify module 210c configured to perform below step S116, a configure module 210d configured to perform below steps S108, S110, and a determine module 210e configured to perform below step S104. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

Figure 3A:
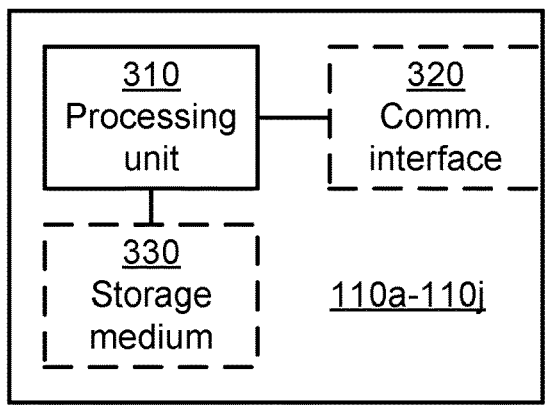
FIG. 3a is a schematic diagram showing functional units of a node according to an embodiment.

FIG. 3a schematically illustrates, in terms of a number of functional units, the components of a node 110a-110j according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the node 110a-110j to perform a set of operations, or steps, S202-S214. These operations, or steps, S202-S214 will be disclosed below. For example, the storage medium 330 may store the set of operations, and the processing circuitry 310 may be configured to retrieve the set of operations from the storage medium 330 to cause the node 110a-110j to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The node 110a-110j may further comprise a communications interface 320 for communications with at least one other node 110a-110j and/or at least one gateway 130. As such the communications interface 320 may comprise one or more transmitters and receivers, comprising analogue and digital components and a suitable number of antennas for wireless communications and ports for wireline communications.

The processing circuitry 310 controls the general operation of the node 110a-110j e.g. by sending data and control signals to the communications interface 320 and the storage medium 330, by receiving data and reports from the communications interface 320, and by retrieving data and instructions from the storage medium 330. Other components, as well as the related functionality, of the node 110a-110j are omitted in order not to obscure the concepts presented herein.

Figure 3B:
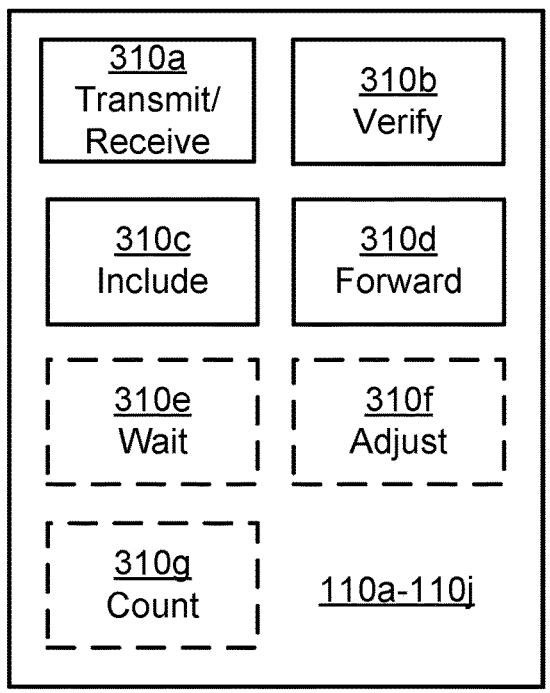
FIG. 3b is a schematic diagram showing functional modules of a node according to an embodiment.

FIG. 3b schematically illustrates, in terms of a number of functional modules, the components of a node 110a-110j according to an embodiment. The node 110a-110j of FIG. 3b comprises a number of functional modules; a transmit and/or receive module 310a configured to perform below steps S202, S204, S214, a verify module 310b configured to perform below step S206, an include module 310c configured to perform below steps S206a, S206b, and a forward module 310d configured to perform below steps S206d, S206e. The node 110a-110j of FIG. 3b may further comprises a number of optional functional modules, such as any of a wait module configured to perform below step S206c, an adjust module 310f configured to perform below step S212, and a count module 310g configured to perform below step S208. The functionality of each functional module 310a-310g will be further disclosed below in the context of which the functional modules 310a-310g may be used. In general terms, each functional module 310a-310g may be implemented in hardware or in software. Preferably, one or more or all functional modules 310a-310g may be implemented by the processing circuitry 310, possibly in cooperation with functional units 320 and/or 3300. The processing circuitry 31 may thus be arranged to from the storage medium 303 fetch instructions as provided by a functional module 310a-310g and to execute these instructions, thereby performing any steps as will be disclosed hereinafter.

Figure 4:
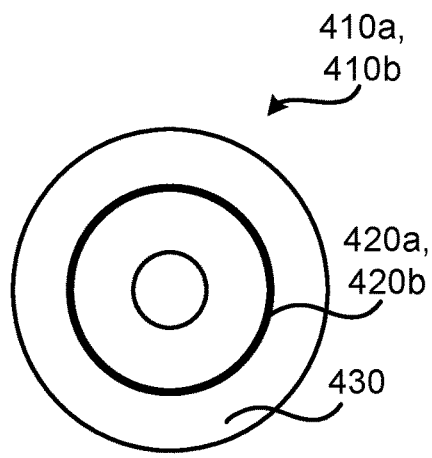
FIG. 4 shows one example of a computer program product comprising computer readable means according to an embodiment.

FIG. 4 shows one example of a computer program product 410a, 410b comprising computer readable means 4300. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the gateway 130 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the node 110a-110j as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 5:
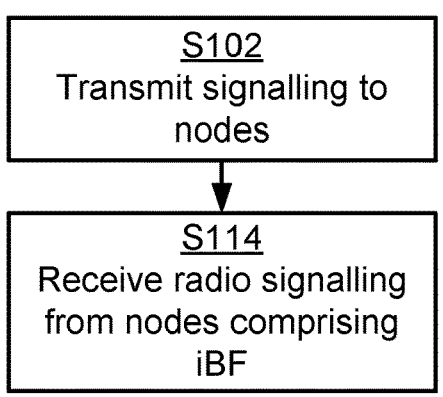
FIGS. 5, 6, 7, and 8 are flowcharts of methods according to embodiments.
Figure 7:
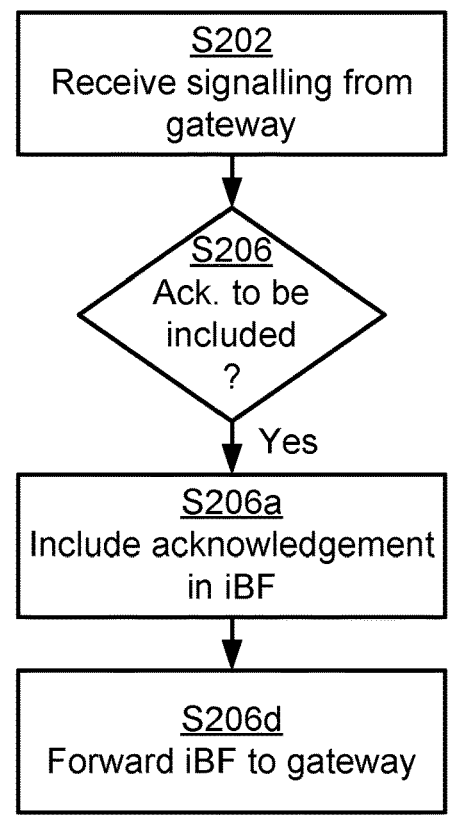
Figure 6:
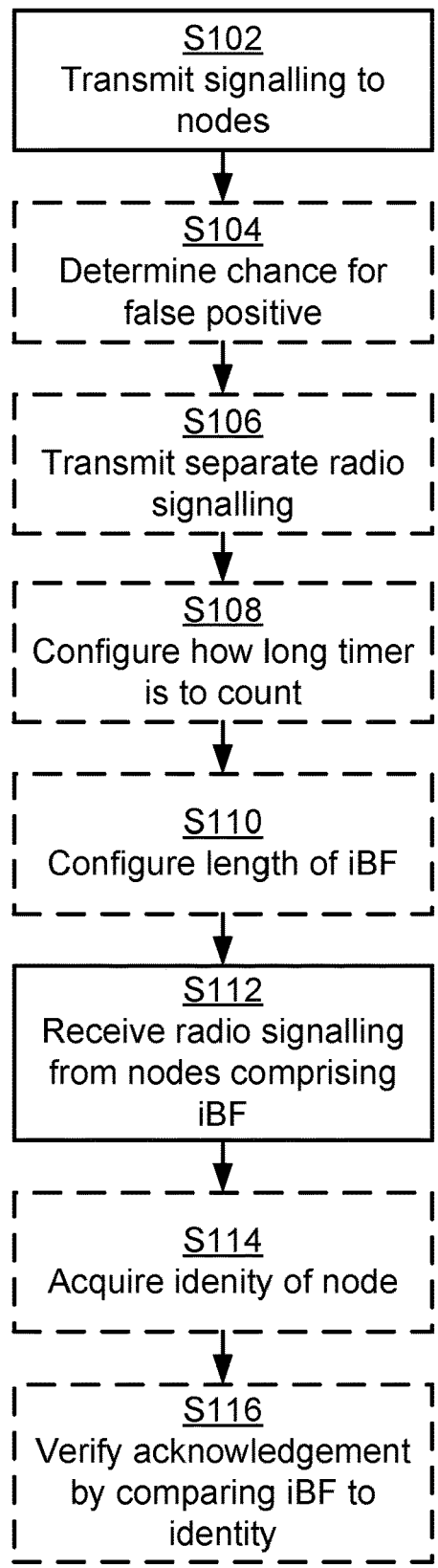
Figure 8A:
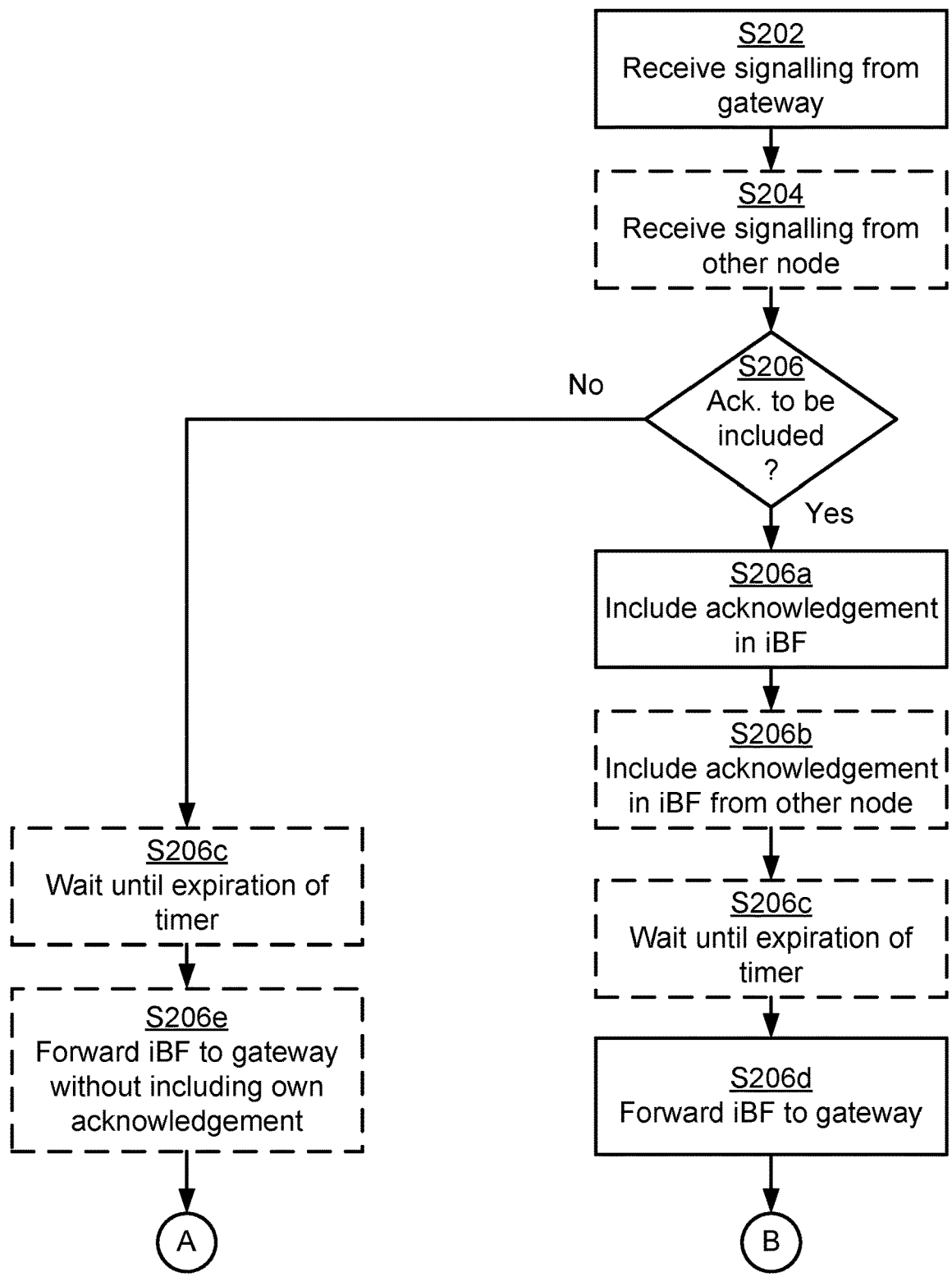
Figure 8B:
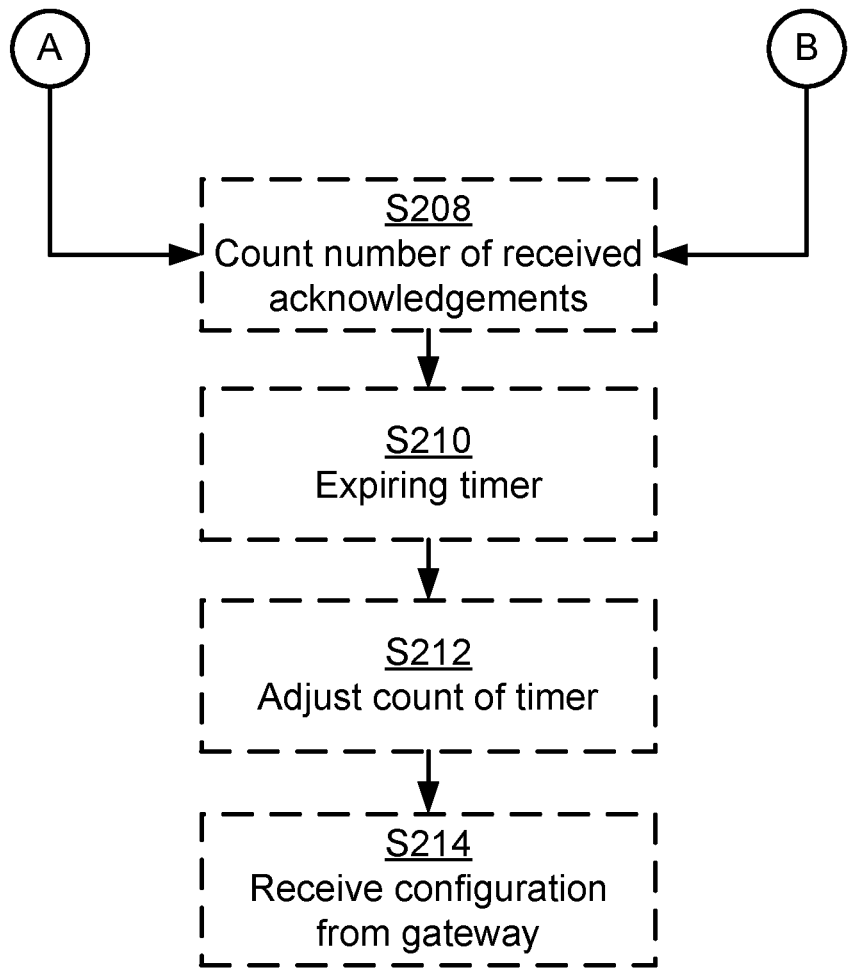

FIGS. 5 and 6 are flow charts illustrating embodiments of methods for handling acknowledgements from nodes in a wireless radio ad-hoc network as performed by the gateway 130. FIGS. 7 and 8 are flow charts illustrating embodiments of methods for handling acknowledgements in a wireless radio ad-hoc network as performed by the node 110a-110j. The methods are advantageously provided as computer programs 42a, 42b.

Reference is now made to FIG. 5 illustrating a method for handling acknowledgements from nodes in a wireless radio ad-hoc network as performed by the gateway 130 according to an embodiment.

iBFs are used to limit the number of acknowledgements sent in the wireless radio ad-hoc network 120 from a group of nodes that receive the same command request (e.g., as sent via multicast or broadcast control) and which requires nodes addressed by the command request to acknowledge safe receipt of the same.

The gateway 130 is configured to, in a step 102, transmit radio signalling to nodes 110a-110j in the wireless radio ad-hoc network 120. The transmitted radio signalling is addressed to, and requires acknowledgement from, at least one node 110a-110j in the wireless radio ad-hoc network 120.

The gateway 130 is configured to, in a step 114, receive radio signalling from a node 110a in the wireless radio ad-hoc network 120, The received radio signalling comprises one in-packet Bloom Filter (iBF) 510a, 510b. The iBF comprises acknowledgement of the transmitted radio signalling from at least one of the nodes 110a-110j. Thereby, each received radio signalling comprises only one iBF, where this iBF may comprise acknowledgements from several nodes. For example, in FIG. 11 the gateway 130 receives one iBF 510a from node 110a and one iBF 510b from node 510b where iBF 510a comprises acknowledgements from nodes 110a, 110b and 110e, and where iBF 510b comprises an acknowledgement from node 110h.

Embodiments relating to further details of handling acknowledgements from nodes in a wireless radio ad-hoc network will now be disclosed.

The transmitted radio signalling may be addressed to, and requiring acknowledgement from, at least two nodes 110a-110j in the wireless radio ad-hoc network 120. One iBF may then comprise acknowledgements of the transmitted radio signalling from at least two of the nodes 110a-110j.

There may be different ways for the gateway 130 to transmit the transmitted signalling. For example, the transmitted signalling may be transmitted as broadcast, multicast, or unicast. Whether to transmit the transmitted signalling as broadcast, multicast, or unicast may depend on how many nodes 110a-110j the transmitted signalling is addressed to; broadcast may be utilized for relatively many addressed nodes 110a-110j, whereas unicast may be utilized for relatively few addressed nodes 110a-110j, and multicast may be utilized for neither relatively many nor relatively few addressed nodes 110a-110j.

There may be different ways for the gateway 130 to receive the received signalling. For example, the received signalling may use Constrained Application Protocol (CoAP) messaging or Internet Protocol (IP) messaging. Hence, the iBF may be provided in an extension header of a CoAP message or an IP message. There may be different kinds of packets to use for the signalling between the gateway 130 and the nodes 110a-110j. Examples of suitable packets are IEEE 802.11ah packets or IEEE 802.15.4 packets, where IEEE is short for Institute of Electrical and Electronics Engineers. The iBF may then be provided in a media access control (MAC) address field of the IEEE 802.11ah packets or IEEE 802.15.4 packets. Further examples of suitable packets are Bluetooth packets, such as Bluetooth low energy packets.

Reference is now made to FIG. 6 illustrating methods for handling acknowledgements from nodes in a wireless radio ad-hoc network as performed by the gateway 130 according to further embodiments.

Assume that the gateway 130 has information about the identities of the nodes in the network. From these identifiers, a iBF entry can be created. When the gateway 130 receives a coalesced acknowledgement from the network it can use the included iBF to verify which nodes have acknowledged the request in this message. For this purpose, the gateway 130 may store the identifiers of the nodes that it requested an acknowledgement from. Hence, according to an embodiment the gateway 130 is configured to, in a step S114, acquire an identity of each node said radio signalling being addressed to and requiring acknowledgement from; and, in a step S116, verify that the transmitted signalling has been acknowledged by comparing the iBF to each identity.

In general terms iBF-based acknowledgements can be used when the gateway 130 must know that certain nodes have received the request. iBFs do not have false negatives; thus if a node responds, the gateway 130 will receive this information. However, since false positives may occur in iBFs, it is possible that the gateway 130 mistakenly determines that a node has sent an acknowledgement even when it might not have actually sent an acknowledgement. This might be acceptable in many non-critical scenarios such as where the nodes represent lighting devices in an office space. Issues resulting from the presence of false positives may be overcome by determining a relative large iBF. Hence, according to an embodiment the gateway 130 is configured to, in a step S104, determine that acknowledgement from at least one of the nodes the transmitted radio signalling being addressed to and requiring acknowledgement from can be represented by a false positive in the iBF. The gateway 130 may then further be configured to, in a step S106, transmit separate radio signalling to nodes in the wireless radio ad-hoc network 130. The transmitted separate radio signalling is addressed to and requires acknowledgement from this separately addressed at least one of the nodes in the wireless radio ad-hoc network 120.

Figure 12:
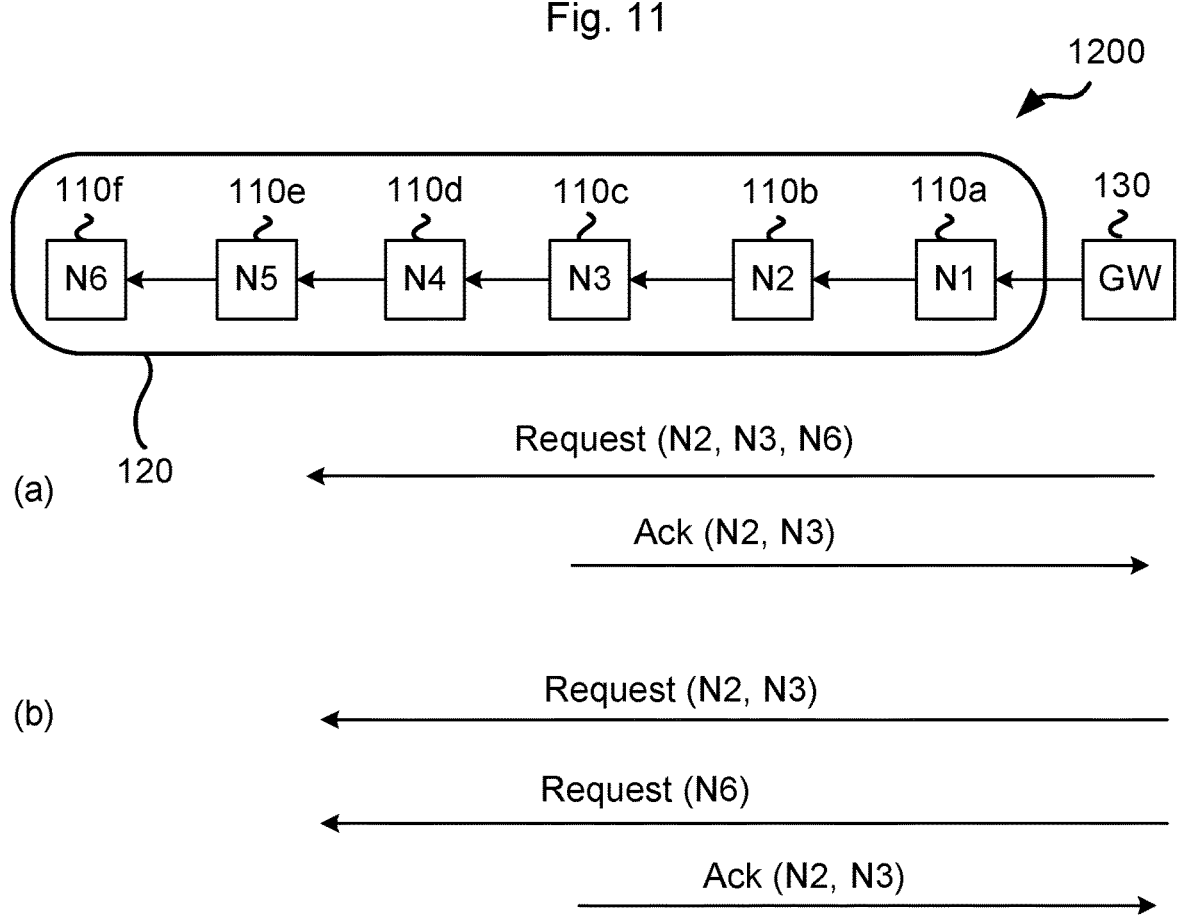
FIG. 12 is a schematic illustration of message transmission in a communication network according to embodiments.

Consider FIG. 12 schematically illustrating a communications network 1100 comprising a gateway 130 and a wireless radio ad-hoc network 120 comprising nodes 110a-110f in a tree topology. In this tree topology it is unlike but still possible that false positives can cause the gateway 130 to make a false verification that node 110f (denoted N6) has received and acknowledged the request message sent from the gateway 130 although the request has never even reached N6. This occurs if the identifiers of node 110b (denoted N2) and node 110c (denoted N3), when inserted in the iBF, can be interpreted as if also N6 would be included in the iBF (i.e., where the acknowledgement of N6 appears as a false positive). This is illustrated at FIG. 12(a). However, as noted above, the gateway 130 can detect this already before sending the request and to avoid the risk it can create two separate requests. This is illustrated at FIG. 12(b). Now the gateway 130 expects two different acknowledgements; one from N2 and N3, and one from N6, and the gateway 130 can detect whether or not N6 sent an acknowledgement.

As will be further disclosed below, reception of the transmitted signal by a node 110a-110j in the wireless radio ad-hoc network 120 may trigger counting of a timer in the node 110a-110j. The gateway 130 may then be configured to, in a step S108, configure how long the timer is to count. Further considerations regarding the timer will be provided below.

The iBF size for collective acknowledgements can be pre-determined by the nodes or the gateway 130 either independently or using a distributed negotiation mechanism. The gateway 130 may therefore be configured to, in a step S110, configure a length of the iBF.

The herein disclosed embodiments of coalescing acknowledgements can be used for different kinds of acknowledgement message types. For example, the acknowledgement may represents either an acknowledgement protocol message (ACK) or a negative acknowledgement protocol message (NAK).

While a tree topology, which is generally the topology used in multicast scenarios, has been used as an example, the herein disclosed embodiments are independent of the topology. For example, the herein disclosed embodiments can be applied to mesh, star and other topologies. Hence, the wireless radio ad-hoc network 120 may have a tree topology, a star topology, or a mesh topology.

Reference is now made to FIG. 7 illustrating a method for handling acknowledgements in a wireless radio ad-hoc network as performed by a node 110a according to an embodiment.

The node 110a is configured to, in a step S202, receive radio signalling originally transmitted from a gateway 130 in the wireless radio ad-hoc network 120. The received radio signalling may by the node 110a be received from another node 110b-110j or from the gateway 130. It is assumed that this radio signalling corresponds to the transmitted radio signalling of step S102. Hence the radio signalling is addressed to, and requires acknowledgement from, at least one node 110a-110j in the wireless radio ad-hoc network 120.

The node 110a is configured to, in a step S206, verify if an acknowledgement of the node 110a is to be sent in response to the received signalling. If an acknowledgement is to be sent the node 110a performs at least step S206a and step S206d. Particularly, the node 110a is configured to, in a step S206a, include the acknowledgement of the node 110a in one iBF. The node 110a is then configured to, in a step S206d, forward this one iBF towards the gateway 130. The iBF may be transmitted to another node 110b-110j or to the gateway 130.

To overcome the issues noted above the, nodes thus utilize iBFs for coalescing their acknowledgement together when sending packets upstream (i.e., towards the gateway 130).

The nodes do not filter any received messages comprising acknowledgements, but forward them towards their destination. Each requested node includes an acknowledgement only in one packet, and if there arrives multiple coalesced acknowledgement messages, the nodes just forwards them but does not add its own acknowledgement in more than one message.

Figure 11:
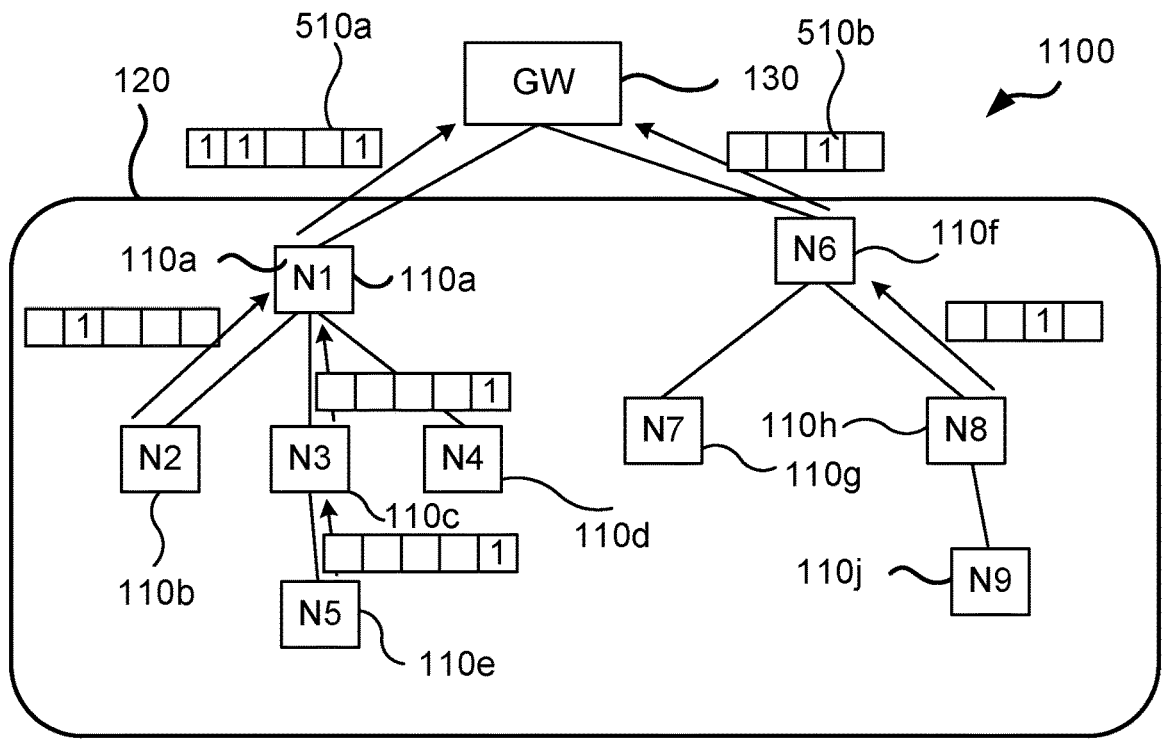

FIG. 11 schematically illustrates a communications network 1100 comprising a wireless radio ad-hoc network 120 and a gateway 130. Nodes 110a-110j are located in the wireless radio ad-hoc network 120 and are operatively connected according to interconnecting lines. For simplicity, each node 110a-110j in FIG. 11 is identified by a single bit in one of two iBFs 510a, 510b. As an example, node 110e (denoted N5) fills an iBF by setting bit 5 to the value 1 and sends it to the upstream node 110c (denoted N3). N3 notices that the gateway 130 does not wish to receive an acknowledgement from it and simply forwards the message received from N5 to node 110a (denoted N1). N1 now coalesces the acknowledgements from N2 and N5 and adds its own acknowledgement by setting a bit at the first position to value 1 and forwards the message to the gateway 130. Hence, the message received from the gateway 130 from N1 comprises three acknowledgements; from N1, N2, and N5. As is visible from the schematic illustration of FIG. 11, the links between nodes are optimally utilized and only a maximum of one message is sent on any link for acknowledgement purposes.

Embodiments relating to further details of handling acknowledgements in a wireless radio ad-hoc network will now be disclosed.

There are different ways for the node 110a to include its acknowledgement in the iBF. For example, the acknowledgement of node 110a may comprise an identity or a cryptographic hash of the node 110a.

Reference is now made to FIG. 8 illustrating methods for handling acknowledgements in a wireless radio ad-hoc network as performed by a node 110a according to further embodiments.

A node, such as any of nodes 110a-11d and 110f-110h in the exemplary wireless radio ad-hoc network 120 may receive signalling from another other node. Each such node may therefore, if addressed, include its own acknowledgement in the iBF of the received signalling before forwarding the signalling towards the gateway 130 or forward the received signalling without including its own acknowledgement if not addressed. Hence, the node 110a may be configured to, in a step S204 receive signalling addressed to the gateway 130 from another node 110b-110j in the wireless radio ad-hoc network 120. The received radio signalling comprises the iBF. The node 110a may be configured to perform the verifying by, in a step S206b, include the acknowledgement of the node 110a in the iBF that is forwarded towards the gateway; and if an acknowledgement of the node 110a is not to be included in the received signalling, in a step S206e, forwarding the received signalling towards the gateway 130 without including any acknowledgement of the node 110a.

Nodes that need to send an acknowledgement upstream may wait to determine whether or not any downstream nodes (i.e., nodes away from the gateway 130) are also sending their acknowledgements. If so, the node simply adds its own identity to the iBF and only pass a single message upstream towards the gateway 130. Hence, according to an embodiment wherein receiving the radio signalling originating from the gateway 130 triggers counting of a timer in the node 110a. The node 110a may then be configured to perform the verifying by, in a step S206c, waiting until expiration of the timer before forwarding the received signalling from the another node towards the gateway 130 in step S206 or step S206e.

At least some of the herein disclosed embodiments thus require the nodes to wait according to a timer before they send their acknowledgements. Nodes that are closer to the gateway 130 need to wait longer than downstream nodes further away from the gateway 130 and may hence wait longer while they wait for acknowledgements from further downstream nodes. The timers can be decided independently or using a distributed negotiation mechanism. Hence, according to an embodiment the node 110a is configured to, in a step S214, receive configuration from the gateway 130 of how long the timer is to count.

The timers can also be a function of the distance from the gateway 130, e.g., measured according to signal strength or the number of hops (also denoted number of wireless radio links) to the gateway 130. The initial request packet sent form the gateway 130 may comprise a hop counter that is increased in each hop (i.e., when packet is forwarded from one node to another node). That is, how long the timer counts may be dependent on physical distance from the node 110a to the gateway 130, signal strength between the node 110a and the gateway 130, number of hops between the node 110a and the gateway 130, or any combination thereof.

The node 110a may enter a wait mode so as to save its power when not receiving or transmitting signalling. There may be different ways for the node 110a to determine when to enter wait mode. For example, the node 110a may be configured to, in a step S208, count the number of received acknowledgements from other nodes 110b-110j in the wireless radio ad-hoc network associated with one occurrence of signal transmission from the gateway 130. Depending on how many such acknowledgements the node 110a has received it may then determine whether to enter the wait mode or not. Particularly, the node 110a may be configured to, in a step S210, expire the timer once a maximum number of received acknowledgements has been received. The node 110a may thereafter ignore any acknowledgements associated with this one occurrence of signal transmission from the gateway 130 acknowledgement. There may be different ways for the node 110a to know the maximum number of received acknowledgements. Either this information is explicitly provided to the node 110a, for example from the gateway 130 (assuming that the gateway 130 is capable of providing such information). Or this information is implicitly acquired by the node 110a itself. This implicit acquiring may require the node 110a to receive and analyse signalling from other nodes 110b-110j in the wireless radio ad-hoc network 120 during a period of time so as to analyse from which other nodes 110b-110j the node 110a may receive signalling from.

As noted above, each node 110a-110j receiving the packet may calculate a timer value for its timer using a pre-defined value and the hop counter in the packet. If a node 110a receives an acknowledgement after its timer has expired, it can still forward the message upstream towards the gateway 130. The node 110a may, according to some embodiments adjust the timer depending on how many times it receives a message after its timer has expired. Hence, according to an embodiment the signalling from another node 110b-110j is by node 110a received after expiry of the timer. The node 110a may then be configured to, in a step S212, adjust how long the timer counts depending on time lapsed after expiry of the timer and/or the number of signalling from another node that is received after expiry of the timer.

Further considerations regarding how the timer may be determined will be disclosed next.

As an illustrative example, consider the network topology of FIG. 12 but where there are only four nodes N1, N2, N3, and N4 in the wireless radio ad-hoc network 120. Assume further that the pre-defined value is 40 ms. This would lead to the following wait values for the nodes:

N1: 40 ms/1=40 ms
N2: 40 ms/2=20 ms
N3: 40 ms/3=13.3 ms
N4: 40 ms/4=10 ms

If a node does not receive a corresponding acknowledgement where it can insert its own acknowledgement within the waiting time, it sends its own acknowledgement.

For example in the above illustrative case and considering that there is 1 ms transmit time between nodes, N4 does not receive any response during 10 ms because there is no further downstream node and N4 thereafter sends an acknowledgement upstream towards N3. At N3, a total time of 1 ms for transmission from N3 to N4+10 ms waiting at N4+1 ms for transmission from N4 to N3=12 ms has passed from the transmission of the packet from N3 to N4. Since the acknowledgement from N4 arrived within the timer value of N3, N3 adds its own acknowledgement in the packet and sends it to N2. At N3 a total time of 1+1+10+1+1=14 ms has passed from the transmission of the packet from N2 to N3, and N2 adds its own acknowledgement in the packet since the acknowledgement from N3 arrived within the timer value of N2. And so does N1.

One issue with the above example is that the nodes need to be aware of the size, in terms of the maximum number of nodes, or hops, from the gateway to a downstream-most edge node. For example, with 20 ms predefined base timer the above illustrative example does not enable a single acknowledgement message to be passed from N4 to the gateway; N3 would have a 6.67 ms timer and N4 a 5 ms timer. When the acknowledgement from N4 arrives at N3, already 1+5+1=7 ms has passed and N3 has already sent its own acknowledgement.

Therefore, let p be the number of hops at any node along the path from gateway to edge node, let n be the maximum number of hops (at the edge) of the wireless radio ad-hoc network 120, and let t be an initial timer value.

Then, according to an embodiment, $t/n+2(n-p)<t/p$ must hold, where $t/n$ is the waiting time at the edge node and $2(n-p)$ is the time that is required to travel from node with hop count p to the edge and back, with 1 ms hops, and where $t/p$ is the timer value at that node. From the expression $t/n+2(n-p)<t/p$ follows that at any node $pt+2np(n-p)<nt$, and $2np(n-p)<t(n-p)$, and $t>2pn$.

The expression $t>2pn$ is maximized when p is maximized, i.e. at the neighboring node of the edge where $p=n-1$ and the corresponding minimum timer value thus must be $t>2\cdot n\cdot(n-1)$. For example, in case of a maximum of 6 hops, $t>2\cdot 6\cdot 5=60$ ms, and in case the maximum number of hops is 3, then $t>2\cdot 3\cdot 2=12$ ms.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the terms gateway and node have been used to distinguish the functionality of these entities from each other. It is foreseen that a gateway may in fact act as a node towards a further upstream gateway. It is likewise foreseen that a node as herein disclosed may act as a gateway for downstream nodes. Hence the herein disclosed entities node and gateway are to be defined by their functionality only.

The invention claimed is:

1. A method for handling acknowledgements from nodes in a wireless radio ad-hoc network, the method being performed by a gateway of said wireless radio ad-hoc network, comprising:
   transmitting a first message via said wireless radio ad-hoc network, said transmitted first message requiring acknowledgement from at least a first node in said wireless radio ad-hoc network;
   receiving a second message transmitted by a second node in said wireless radio ad-hoc network, wherein said received second message comprises a packet containing an in-packet Bloom Filter (iBF) generated by the second node and comprising at least one acknowledgement of said transmitted first message from at least one node in said wireless radio ad-hoc network;
   acquiring an identity of the first node; and
   based on the iBF generated by the second node and the acquired identity of the first node, determining whether the first node has acknowledged the first message, wherein the determining comprises comparing the iBF generated by the second node to the acquired identity of the first node.

2. The method according to claim 1, wherein said first message requires acknowledgement from at least two nodes in said wireless radio ad-hoc network, said at least two nodes including the first node and the second node, and wherein said iBF generated by the second node comprises acknowledgements of said first message from the first node and the second node.

3. The method according to claim 2, further comprising:
   acquiring an identity of the second node; and
   verifying that said first message has been acknowledged by the second node by comparing said iBF generated by the second node to said acquired identity of the second node.

4. The method according to claim 3, wherein
the first message comprises a packet comprising packet header comprising an iBF that the the first node and the second are requested to transmit an acknowledgement in response to receiving the first message.

5. The method according to claim 1, wherein reception of said first message by a node in the wireless radio ad-hoc network triggers counting of a timer in said node, and wherein the method further comprises:
configuring how long said timer is to count.

6. The method according to claim 1, further comprising:
determining that acknowledgement from at least one of the nodes said first message being addressed to and requiring acknowledgement from can be represented by a false positive in said iBF; and
transmitting separate radio signaling to nodes in said wireless radio ad-hoc network, said transmitted separate radio signaling being addressed to and requiring acknowledgement from said at least one of the nodes in said wireless radio ad-hoc network.

7. The method according to claim 1, wherein
said packet is either: a Constrained Application Protocol (CoAP) protocol data unit (PDU) and an Internet Protocol (IP) PDU, and
said iBF is provided in an extension header of the CoAP PDU or in an extension header of the IP PDU.

8. The method according to claim 1, wherein said second message is received using IEEE 802.11ah packets or IEEE 802.15.4 packets, and wherein said iBF is provided in a media access control, MAC, address field of said IEEE 802.11ah packets or IEEE 802.15.4 packets, where IEEE is short for Institute of Electrical and Electronics Engineers.

9. A computer program product comprising a non-transitory computer readable medium storing a computer program for handling acknowledgements from nodes in a wireless radio ad-hoc network, the computer program comprising computer code which, when run on processing circuitry of a gateway, causes the gateway to perform the method of claim 1.

10. A method for handling acknowledgements in a wireless radio ad-hoc network, the method being performed by a first node in said wireless radio ad-hoc network, comprising:
receiving a first message originally transmitted by a gateway in said wireless radio ad-hoc network, said first message requiring acknowledgement from at least one node in said wireless radio ad-hoc network;
determining whether an acknowledgment of the first node is to be sent in response to said received first message;
receiving a second message transmitted by a second node in the wireless radio ad-hoc network, wherein the second message comprises an in-packet Bloom Filter (iBF); and
after determining that the acknowledgement of the first node is to be sent, modifying the received iBF by including said acknowledgement of the first node in the iBF and forwarding towards said gateway a third message comprising said modified iBF.

11. The method according to claim 10, further comprising:
after forwarding the third message comprising the modified iBF, receiving a fourth message transmitted by a third node in the wireless radio ad-hoc network, wherein the fourth message comprises an iBF; and
as a result of receiving the fourth message after forwarding the third message comprising the modified iBF, forwarding the fourth message toward the gateway without making any modifications to the iBF included in the fourth message.

12. The method according to claim 11, wherein receiving said first message originating from the gateway triggers counting of a timer, and wherein said determining comprises:
waiting until expiration of said timer before forwarding said received signaling from said another node towards said gateway.

13. The method according to claim 12, wherein how long said timer counts is dependent on at least one of physical distance from the node to the gateway, signal strength between the first node and the gateway, and/or number of hops between the first node and the gateway.

14. The method according to claim 12, wherein said second message from said second node is received after expiry of said timer, the method further comprising:
adjusting how long said timer counts depending on time lapsed after expiry of said timer and/or number of message from another node received after expiry of said timer.

15. The method according to claim 12, further comprising:
counting number of received acknowledgements from other nodes in the wireless radio ad-hoc network associated with one occurrence of signal transmission from the gateway; and
expiring said timer once a maximum number of received acknowledgements has been received, and thereafter ignoring any acknowledgements associated with said one occurrence of signal transmission from the gateway.

16. The method according to claim 10, wherein said acknowledgement comprises an identity or a cryptographic hash of the node.

17. The method according to claim 10, wherein said received radio signaling is received using IEEE 802.11ah packets or IEEE 802.15.4packets, and wherein said iBF is provided in a media access control, MAC, address field of said IEEE 802.11ah packets or IEEE 802.15.4 packets, where IEEE is short for Institute of Electrical and Electronics Engineers.

18. A computer program product comprising a non-transitory computer readable medium storing a computer program for handling acknowledgements in a wireless radio ad-hoc network, the computer program comprising computer code which, when run on processing circuitry of a node, causes the node to perform the method of claim 10.

19. A gateway for handling acknowledgements from nodes in a wireless radio ad-hoc network, the gateway comprising processing circuitry, the processing circuitry being configured to cause the gateway to perform a set of operations comprising:
transmitting a first message via said wireless radio ad-hoc network, said transmitted first message requiring acknowledgement from at least a first node in said wireless radio ad-hoc network;
receiving a second message transmitted by a second node in said wireless radio ad-hoc network, wherein said received second message comprises a packet containing an in-packet Bloom Filter (iBF) generated by the second node and comprising at least one acknowledgement of said transmitted first message from at least one node in said wireless radio ad-hoc network;
acquiring an identity of the first node; and based on the iBF generated by the second node and the acquired identity of the first node, determining whether the first node has acknowledged the first message, wherein the determining comprises comparing the iBF generated by the second node to the acquired identity of the first node.

20. A node for handling acknowledgements in a wireless radio ad-hoc network, the node comprising processing circuitry, the processing circuitry being configured to cause the node to perform a set of operations comprising:

receiving a first message originally transmitted by a gateway in said wireless radio ad-hoc network, said first message requiring acknowledgement from at least one node in said wireless radio ad-hoc network;

determining whether an acknowledgement of the first node is to be sent in response to said received first message;

receiving a second message transmitted by a second node in the wireless radio ad-hoc network, wherein the second message comprises an in-packet Bloom Filter (iBF); and after determining that the acknowledgement of the first node is to be sent, modifying the received iBF by including said acknowledgement of the first node in the iBF and forwarding towards said gateway a third message comprising said modified iBF.

* * * * *